United States Patent
Wolf et al.

(10) Patent No.: US 7,830,138 B2
(45) Date of Patent: Nov. 9, 2010

(54) INDICATOR ELEMENT FOR A MAGNETIC ROTATION ANGLE SENSOR

(75) Inventors: Marco Wolf, Hochstadt (DE); Bernd Hoffelder, Roemerberg (DE)

(73) Assignee: Tyco Electronics AMP GmbH, Bensheim (DE)

( * ) Notice: Subject to any disclaimer, the term of this patent is extended or adjusted under 35 U.S.C. 154(b) by 419 days.

(21) Appl. No.: 12/049,087

(22) Filed: Mar. 14, 2008

(65) Prior Publication Data

US 2008/0231262 A1  Sep. 25, 2008

(30) Foreign Application Priority Data

Mar. 22, 2007  (DE) .................. 10 2007 013 755

(51) Int. Cl.
 *G01B 7/30* (2006.01)
(52) U.S. Cl. .............. 324/207.25; 324/207.22
(58) Field of Classification Search ........... 324/207.25, 324/207.22, 174, 207.2, 207.21; 33/1 PT; 384/448
See application file for complete search history.

(56) References Cited

U.S. PATENT DOCUMENTS

| | | | | |
|---|---|---|---|---|
| 6,356,073 B1 * | 3/2002 | Hamaoka et al. | ......... | 324/207.2 |
| 6,614,223 B2 * | 9/2003 | Schroeder et al. | ...... | 324/207.22 |
| 6,720,763 B1 * | 4/2004 | Nehl et al. | ............. | 324/207.25 |
| 6,753,681 B2 * | 6/2004 | Enomoto et al. | ........ | 324/207.25 |
| 7,652,470 B2 * | 1/2010 | Spratte | .................. | 324/207.21 |
| 2001/0009366 A1 * | 7/2001 | Kono et al. | ............... | 324/207.2 |
| 2003/0034775 A1 | 2/2003 | Schroeder et al. | | |

FOREIGN PATENT DOCUMENTS

WO  2007/012419 A2  2/2007

* cited by examiner

*Primary Examiner*—Kenneth J Whittington
(74) *Attorney, Agent, or Firm*—Barley Snyder LLC

(57) ABSTRACT

An indicator element for a magnetic rotation angle sensor having a field probe for generating a sensor signal in response to a geometric position of the indicator element relative to the field probe is disclosed. The indicator element has a permanent magnet with an annular cross-section having a plurality of segments, magnetization of the segments being in different directions so that a homogeneous magnetic field is formed in an inner region of the indicator element into which the field probe is arranged. At least two segments exhibit radial or diametrical magnetization and at least two segments exhibit lateral magnetization.

17 Claims, 3 Drawing Sheets

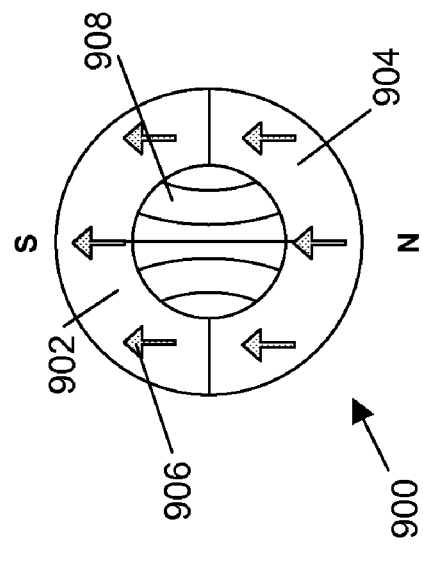
FIG. 9
(Prior Art)
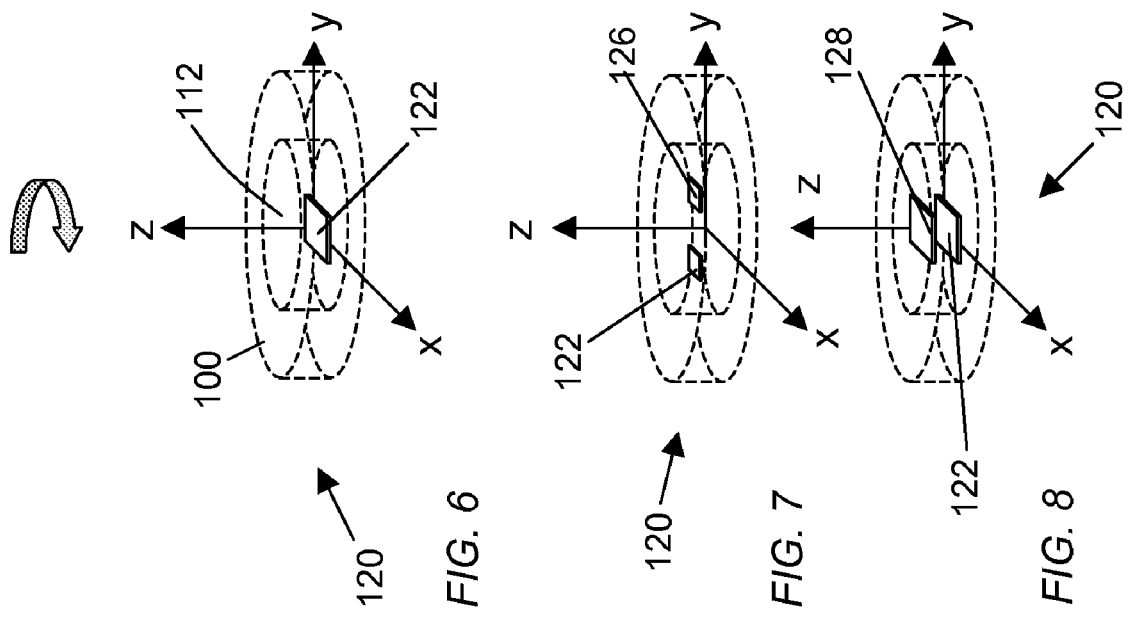
FIG. 6
FIG. 7
FIG. 8

INDICATOR ELEMENT FOR A MAGNETIC ROTATION ANGLE SENSOR

CROSS-REFERENCE TO RELATED APPLICATION DATA

This application claims the benefit of the earlier filed German Patent Application No. DE 10 2007 013 755.0 having a filing date of Mar. 22, 2007.

FIELD OF THE INVENTION

The present invention relates to the field of magnetic rotation angle sensors.

BACKGROUND

Contactless detection of a relative angular position is a widely used application of sensors in industry. In particular, when detecting the angle of rotation magnetically in a contact-free manner, an indicator element, which produces a magnetic field, is connected to a rotor and the magnetic field, which changes as a function of the angular position of the indicator element, of a field probe is detected, the field probe being mounted on a stator, so as to be stationary relative to the indicator element. Alternatively, it is known to mount the indicator element, which produces the magnetic field, so as to be stationary and to position the field probe so as to be movable relative the indicator element. Only the relative movement between the indicator element and the field probe is significant for the principles according to the invention which are described in the following. It is thus substantially irrelevant which of the two parts is to be considered the stator and which the rotor. Generally, however, the stationary installation of the field probe is to be preferred due to the electrical signal processing required.

It is thus known to use a permanent magnet with an annular cross-section as the magnetic field-generating indicator element, as shown in Prior Art FIG. 9. In its known embodiment, the permanent magnet 900 is formed by two diametrically magnetized portions 902, 904. The arrows 906 indicate the magnetic field lines which, as is generally known, are directed from the magnetic north pole to the magnetic south pole. As shown in Prior Art FIG. 9, the inner region 908 of the permanent magnet 900 is, however, permeated by a comparatively inhomogeneous magnetic field, with this diametrical polarization of the magnetization.

This has the drawback that, on the one hand, a single field probe, which is arranged in this region to detect a relative rotational movement between the permanent magnet and the field probe, must be accommodated as exactly as possible at the center of said inner region 908 in order to obtain a reproducible linear signal. The arrangement is therefore particularly sensitive to positional tolerances such as axis misalignment or axis tilting.

On the other hand, the known arrangement cannot be used to produce a redundant rotation angle sensor principle in which more than one field probe is arranged in the interior 908 of the indicator element, because there is not sufficient space available with identical field conditions.

Now, a discussion of known magnetic characterizations is provided. In general, what is known as the MR effect (magnetoresistive effect) occurs in all conductive materials. The electrical resistance thus increases when a magnetic field is applied, because the charge carriers are deflected from their straight movement and this leads to an increase in the length of the path. In principle, the magnetoresistive effect only achieves useful changes in resistance at very high magnetic field strengths in materials which are good conductors, such as copper. Bismuth has the greatest resistance lift of any metal. In specific semiconductor materials, which are generally referred to as magnetoresistors, changes in resistance of more than 100% can be achieved.

What is known as the anisotropic magnetoresistive effect (AMR effect) occurs in magnetic materials. The resistivity thereof is a few percent greater parallel to the magnetization than perpendicular thereto. The magnetization can be simply rotated in thin sheets made of said material in such a way that sensors can be produced. In 1998, what is known as the giant magnetoresistive effect (GMR effect) was discovered and it led to a development which resulted in the discovery or rediscovery of further MR effects, which are conventionally combined under the collective term XMR in the literature.

The GMR effect occurs in the layer systems with at least two ferromagnetic layers and a metal intermediate layer. If the magnetization in said layers is not parallel, the resistance is greater than if the magnetization were parallel. This can involve a difference of up to 50%, thus resulting in the name "giant".

What is known as the tunnel magnetoresistive effect (TMR effect) occurs in layer systems with at least two ferromagnetic layers and a thin insulating layer. The tunnel resistance between the two layers is dependent on the angle of the two magnetization directions to one another, exactly as with the GMR effect.

The colossal magnetoresistive effect (CMR effect) is a volume effect and occurs predominantly in perovskite materials. At temperatures in the vicinity of their transition temperature from metallic to semiconductor behavior, changes in resistance of more than 200% have been observed. Until now, however, this effect is only known to occur in materials having a transition temperature of less than 100 Kelvin.

The giant magnetic inductance effect (GMI effect) predominantly occurs in wires which have a surface layer made of a magnetic material. Said layer must have magnetization annularly about the wire. Said magnetization is also rotated in the wire direction by magnetic fields in the longitudinal direction of the wire. The inductance of the wire thus changes, in particular at high frequencies, since the skin effect is influenced by the magnetic layer. This effect can also be observed in the case of magnetic double layers, although to a substantially lower extent.

In contrast to the known Hall elements, which measure the magnetic flow and are thus susceptible to interference in terms of geometric factors, dimensions, the influence of temperature variations, and material variations, magnetoresistive sensors are operated with a saturated soft magnetic layer and a magnet, which is saturated during magnetization, and only the direction of the field, but not the flux density, is measured. A particular minimum flux density is thus always provided. Therefore, the use of magnetoresistive sensors offers the advantage of greatly increased robustness and resistance to interference, which is important, in particular for use in motor vehicles.

SUMMARY

The present invention relates to, in one embodiment among others, an indicator element for a magnetic rotation angle sensor having a field probe for generating a sensor signal in response to a geometric position of the indicator element relative to the field probe. The indicator element has a permanent magnet with an annular cross-section having a plurality of segments, magnetization of the segments being in different directions so that a homogeneous magnetic field is formed in an inner region of the indicator element into which the field probe is arranged. At least two segments exhibit radial or diametrical magnetization and at least two segments exhibit lateral magnetization.

BRIEF DESCRIPTION OF THE DRAWINGS

In order to facilitate a better understanding of the present invention, said invention is described in greater detail with reference to the embodiments shown in the following figures. Like parts in the different described embodiments are thus provided with like reference numerals and like component descriptions, the disclosures contained in the entire description being able to be transferred analogously to like parts with like reference numerals or component descriptions. Furthermore, some features or feature combinations from the different embodiments shown and described themselves represent independent or inventive solution or solutions according to the invention.

FIG. 6 shows a magnetic rotation angle sensor with a single centrally-arranged field probe;

FIG. 7 shows a magnetic rotation angle sensor with two field probes spaced radially from one another;

FIG. 8 shows a magnetic rotation angle sensor with two field probes spaced axially from one another; and Prior Art FIG. 9 shows a known diametrically magnetized indicator element.

DETAILED DESCRIPTION OF THE EMBODIMENTS

Possible fields of application of a magnetic rotation angle sensor according to the invention is angle measurement in a motor vehicle, for example for throttles, swirl flaps, exhaust gas recirculation valves, turbochargers with variable turbine geometry, adjustable forward lighting, drive position recognition in automatic transmission, gear recognition in automatic gearboxes, pedal travel measurement and pedal angle measurement in the pedal mechanism, angle measurement for a convertible soft top or other movable chassis parts, and the detection of the rotor position in brushless d.c. motors.

In order to eliminate disruptions such as the influence of temperature or electromagnetic interference via subtraction, the rotation angle sensor according to the invention can be fitted with further field probes (discussed infra), the redundant signals of which can be used for error correction by means of appropriate signal processing. The redundant field probes can thus be arranged at a distance from a first field probe either in a radial direction or, however, in an axial direction. "Axial direction" refers to the direction which substantially corresponds to the axis of rotation about which the angle of rotation to be detected occurs, while the "radial direction" extends transverse to said axis of rotation.

The annular indicator elements 100, 200 are preferably rotatable about the longitudinal axes thereof, while the magnetic field probe (discussed infra), which is to be electrically connected to a system to be controlled or optionally to an evaluation circuit, remains stationary at a predetermined distance from the inner surface of the permanent magnet. However, if the mass of the indicator elements 100, 200 is high, the indicator elements 100, 200 may alternatively be stationary and the magnetic field probes may be rotatable. The mechanical construction may correspond to any known construction of a rotation angle sensor of the known type.

Figure 1:
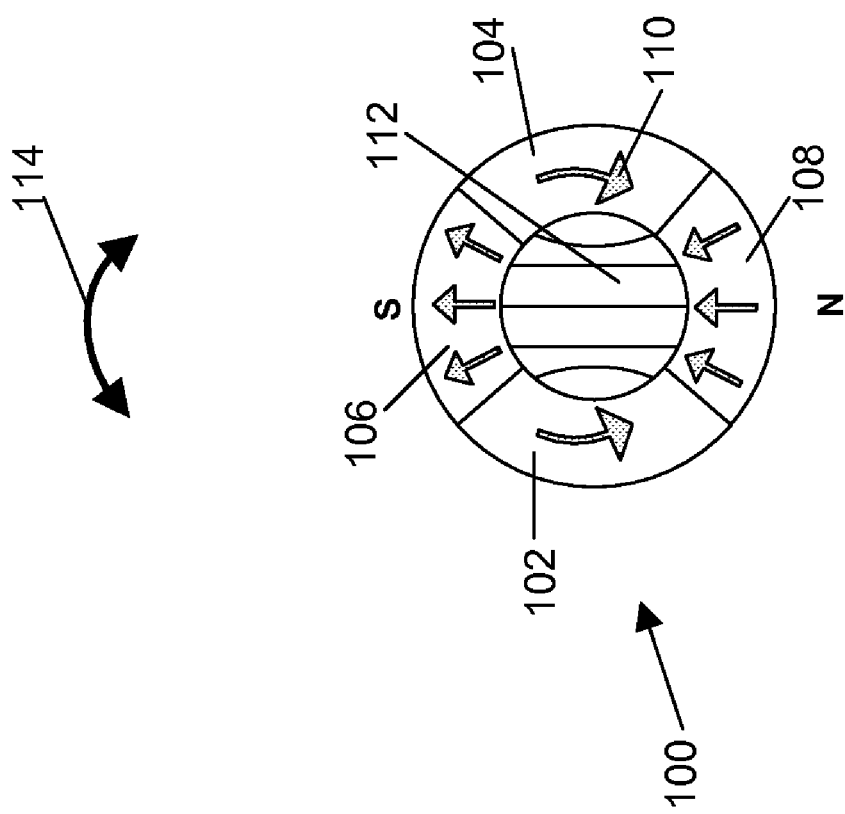
FIG. 1 shows an indicator element for a magnetic rotation angle sensor according to a first embodiment.

In the following, the fundamental principle of the present invention is to be described in greater detail with reference to FIG. 1. The magnetic indicator element 100 according to the invention is constructed as a permanent magnet with an annular cross-section and, in a first embodiment, comprises four ring-segment-shaped portions, first segment 102, second segment 104, third segment 106, and fourth segment 108, as shown in FIG. 1. The first and second segments 102 and 104 are, in this case, oriented laterally in terms of their magnetic polarization, as indicated by the arrows that represent magnetic fields lines 110. The first and second segments 102 and 104 are thus opposite one another.

The third and fourth segments 106 and 108 are, in contrast thereto, magnetized radially in such a way that the magnetic field (shown schematically) forms in the inner region 112 of the indicator element 100. Comparing this configuration with the known indicator element 900 in Prior Art FIG. 9, shows the significantly improved homogeneity of the magnetic field in the interior of the indicator element 100.

If the indicator element 100 is used in a magnetic rotation angle sensor, at least one field probe (discussed infra) is arranged in the inner region 112 and relative rotation, indicated by an arrow showing a direction of rotation 114, between the field probe and the indicator element 100 is detected. Without restricting the general scope, it is to be assumed in the following that the indicator element 100 rotates about an axis of rotation which extends transversely to the plane of projection, about the field probe.

It is also possible to achieve a similar field line characteristic in the inner region 112 of the indicator element 100 by magnetization counter to the arrow directions indicating magnetic field lines 110 shown in FIG. 1. An important factor in the solution according to the invention is the change between radial and lateral alignment of the magnetization.

Further refinement and increased homogenization of the magnetic field in the interior 112 of the indicator element 100 can be achieved by further subdividing the cross-section into differently magnetized segments.

Figure 2:
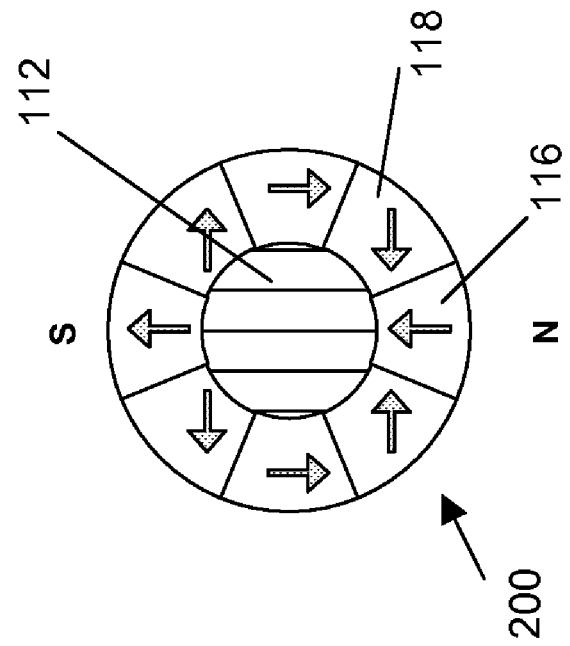
FIG. 2 shows an indicator element for a magnetic rotation angle sensor according to a second embodiment.

In FIG. 2, an indicator element 200 according to another embodiment is shown in which the diametrically polarized fifth segments 116 are alternated with laterally polarized sixth segments 118 to assemble a total of eight different magnet segments having different diametrical and lateral magnetization. Alternatively to the polarities shown in FIG. 2, the respective opposite polarities may also be selected. Furthermore, it is of course possible to have a finer subdivision into segments with different magnetization directions. Continuous transitions of the field directions from segment to segment may be produced by a corresponding assembly of segments based on the magnetization during the production process. The superimposition of individual magnetic fields results, according to the invention, in the field lines extending linearly in the inner region 112 of the permanent magnet of indicator element 200.

The homogeneous configuration according to the invention shown in FIGS. 1 and 2 of the magnetic field in the inner region 112 of the indicator elements 100, 200 results in a particularly high level of robustness against deviations from the ideal position between a field probe and the indicator elements 100, 200.

Figure 5:
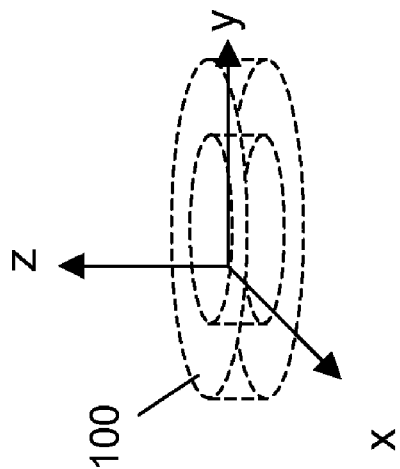
FIG. 5 is a schematic perspective view of an indicator element with an axis shift transverse to the axis of rotation.
Figure 4:
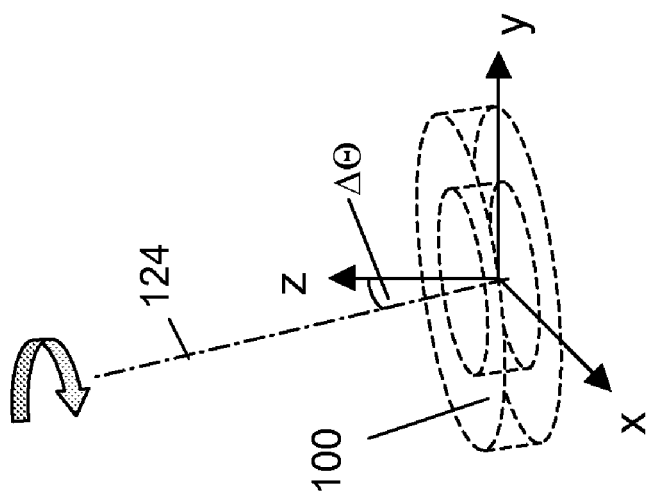
FIG. 4 is a schematic view of an indicator element with tilting between the field probe and the axis of rotation.
Figure 3:
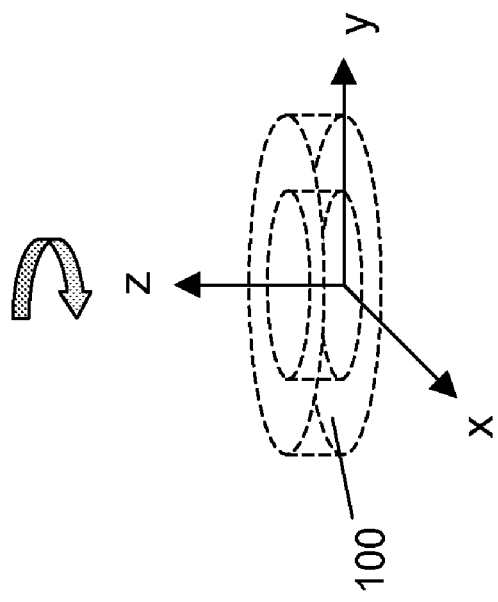
FIG. 3 is a schematic perspective view of an indicator element with a shift in the direction of the axis of rotation.

The geometrical relationships in this arrangement are shown schematically in FIGS. 3 to 5. The Cartesian coordinate system marked indicates the ideal alignment, the field probe being arranged in the origin thereof. In FIG. 3, the indicator element 100 is arranged relative to the field probe in the origin of the coordinate system in such a way that the axis of rotation of the indicator element 100 coincides with the z-axis, but in such a way that there is a position shift $\Delta z$ in the direction of the axis of rotation. FIG. 4 shows tilting between the z-axis and the axis of rotation 124 of the indicator element 100 by an angle $\Delta\theta$. Finally, in FIG. 5, the indicator element 100 is shifted transversely to the axis of rotation in the direction of the x-axis and/or the y-axis.

All of the deviations shown in the drawings in a somewhat exaggerated manner, may be compensated for with the homogeneous field distribution according to the invention in the indicator element 100. The installation tolerances therefore do not have to be adhered to as strictly as in the known indicator elements and production is simplified accordingly.

FIGS. 6 to 8 schematically show rotation angle sensors 120 according to the present invention. FIG. 6 shows a rotation angle sensor 120 with an indicator element 100 according to the invention and a single first field probe 122. In this case, the ideal position between the first field probe 122 and the indicator element 100 is shown, i.e. the first field probe 122 is located exactly in the center of the inner region 112, and the axis of rotation 124, about which the indicator element 100 rotates, coincides with the z-axis. However, due to the configuration according to the invention of the indicator element 100, the deviations indicated in FIGS. 3 to 5 may obviously be compensated for.

Due to the linear characteristic of the field in the inner region 112 of the indicator element 100, redundant second field probes 126 and redundant third field probes 128, with a radial or axial shift, respectively, may advantageously also be provided, as shown in FIGS. 7 and 8. Common-mode interference caused for example by electromagnetic interference or the effect of temperature, as is generally known in sensor technology, is eliminated via corresponding signal evaluation of the field probes 122, 126, 128.

As previously mentioned, Hall effect sensors as well as inductive sensors or electron-spin-based sensors, such as AMR sensors and GMR sensors, may be used as field probes 122, 126, 128. In any case, a great tolerance range with regard to shifting and tilting can be produced with low interaction to form the desired signal due to homogeneous field alignment. The present invention is thus based on the idea that by constructing the indicator elements 100, 200 as a permanent magnet with a large number of segments such as segments 102, 104, 106, 108, 116, and 118 (the magnetization of which is in different directions) provides a substantially homogeneous magnetic field in the inner region 112 of the permanent magnet. Therefore, substantial independence from the exact position of the field probes 122, 126, 128 in the inner region 112 of the permanent magnet is achieved. If, in the ideal case, the entire inner region 112 of the indicator elements 100, 200 are permeated by a substantially homogeneous field, redundant field probes 122, 126, 128 may be integrated by using miniaturized field probes which are currently available, which can eliminate disruptions by forming differential signals. In this case, the term "direction of magnetization" refers to the position of the magnetic field lines in space, i.e. radially, axially, tangentially (or laterally) and diametrically, the actual polarization according to the invention being able to be provided in the two possible polarities.

In principle, a low level of shear can be achieved in the magnetic circuit due to the configuration according to the invention of the permanent magnet and, for this reason, materials with low residual magnetism such as ferrite or plastic-bonded rare earth magnets may be used. Since a closed magnetic circuit is formed by the reflux within the magnet geometry, there is only a low level of interaction with a ferromagnetic environment. The signal is thus highly resistant to interference. Hybrids of ferrite and rare earth magnets are of course also possible.

In one embodiment of the magnetic rotation angle sensor according to the invention, the field probe 122, 126, 128 may be formed by a Hall effect device. Hall elements have the advantage that they can be produced cost-effectively with a good level of linearity and are based on mature technology.

However, in other embodiments, the magnetoresistive sensors may also be, for example, a sensor with one of the following effects: AMR (anisotropic magnetoresistive) effect, GMR (giant magnetoresistive) effect, TMR (tunnel magnetoresistive) effect, CMR (colossal magnetoresistive) effect or GMI (giant magneto-inductance) effect.

The magnet arrangement according to the invention of the indicator elements 100, 200 can be produced efficiently and cost-effectively in a particularly simple manner using plastic material technology, such as injection molding technology. A flexible and universally employable magnetic rotation angle sensor can thus be produced, satisfying the requirements of robustness, accuracy and cost-effective production, in particular in the automotive industry. Further, the present invention provides an indicator element 100, 200 for a magnetic rotation angle sensor and an associated magnetic rotation angle sensor with optimal field characteristics.

What is claimed is:

1. An indicator element for a magnetic rotation angle sensor comprising a field probe for generating a sensor signal in response to a geometric position of the indicator element relative to the field probe, the indicator element comprising:
    a permanent magnet with an annular cross-section having a plurality of segments, magnetization of the segments being in different directions so that a homogeneous magnetic field is formed in an inner region of the indicator element into which the field probe is arranged;
    wherein at least two segments exhibit radial or diametrical magnetization and at least two segments exhibit lateral magnetization.

2. The indicator element according to claim 1, wherein the segments are each formed by different ring segments of the permanent magnet.

3. The indicator element according to claim 1, wherein the segments are assembled in such a way that there are continuous transitions between magnetic field directions of the segments.

4. The indicator element according claim 1, wherein the indicator element is constructed of a plastic-bonded magnetic material.

5. The indicator element according to claim 4, wherein the indicator element is constructed of a plastic-bonded ferrite material and/or a plastic-bonded rare earth material.

6. The indicator element according to claim 4, wherein the indicator element is constructed by injection molding.

7. The indicator element according to claim 5, wherein the indicator element is constructed by injection molding.

8. A magnetic rotation angle sensor with a first field probe for generating a sensor signal in response to a geometric position of an indicator element relative to the first field probe, the indicator element comprising:

a permanent magnet with an annular cross-section having a plurality of segments, magnetization of the segments being in different directions so that a homogeneous magnetic field is formed in an inner region of the indicator element into which the first field probe is arranged;

wherein at least two segments exhibit radial or diametrical magnetization diametrical and at least two segments exhibit lateral magnetization.

9. The magnetic rotation angle sensor according to claim 8, wherein the first field probe comprises at least one Hall effect device.

10. The magnetic rotation angle sensor according to claim 8, wherein the first field probe comprises at least one magnetoresistive sensor.

11. The magnetic rotation angle sensor according to claim 10, wherein the at least one magnetoresistive sensor comprises an anisotropic magnetoresistive sensor.

12. The magnetic rotation angle sensor according to claim 10, wherein the at least one magnetoresistive sensor comprises a giant magnetoresistive sensor.

13. The magnetic rotation angle sensor according to claim 10, wherein the at least one magnetoresistive sensor comprises a tunnel magnetoresistive sensor.

14. The magnetic rotation angle sensor according to claim 8, wherein a second field probe is arranged so as to be axially spaced from the first field probe in order to generate a redundant sensor signal.

15. The magnetic rotation angle sensor according to claim 8, wherein a third field probe is arranged so as to be radially spaced from the first field probe in order to generate a redundant sensor signal.

16. The magnetic rotation angle sensor according to claim 8, wherein the indicator element is arranged on a rotor so as to be rotatable relative to the first field probe.

17. The magnetic rotation angle sensor according to claim 8, wherein the first field probe is arranged on a rotor so as to be rotatable relative to the indicator element.

* * * * *